United States Patent
Frock et al.

(10) Patent No.: US 10,357,126 B2
(45) Date of Patent: Jul. 23, 2019

(54) STEAM GENERATOR

(71) Applicant: ILLINOIS TOOL WORKS INC., Glenview, IL (US)

(72) Inventors: Jeffrey L. Frock, Troy, OH (US); Michael B. Reckner, Dayton, OH (US); Timothy L. Cupp, Hillsboro, OH (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 265 days.

(21) Appl. No.: 15/263,456

(22) Filed: Sep. 13, 2016

(65) Prior Publication Data
US 2017/0208985 A1    Jul. 27, 2017

Related U.S. Application Data

(63) Continuation-in-part of application No. 15/056,220, filed on Feb. 29, 2016.
(Continued)

(51) Int. Cl.
*A47J 27/04* (2006.01)
*F22B 1/28* (2006.01)
(Continued)

(52) U.S. Cl.
CPC ............... *A47J 27/04* (2013.01); *A47L 15/14* (2013.01); *A47L 15/4285* (2013.01);
(Continued)

(58) Field of Classification Search
CPC ..... A47J 27/04; A47J 2027/043; F22B 1/284; F22B 37/486; A47L 15/14;
(Continued)

(56) References Cited

U.S. PATENT DOCUMENTS 325,476 A  *  9/1885  Baker ..................... B01D 1/26
                                                  122/430
519,419 A  *  5/1894  Boyce ...................... F01L 1/28
                                                   122/79
(Continued)

FOREIGN PATENT DOCUMENTS

| DE | 102007024007 | 11/2008 | |
|---|---|---|---|
| EP | 0383327 A1 * | 8/1990 | ............ A47J 27/04 |
| JP | 04293461 A * | 10/1992 | ............ A21B 3/04 |
| WO | WO 01/06196 | 1/2001 | |

OTHER PUBLICATIONS

"DE_102007024007_A1_M—Machine Translation.pdf", machine translation, EPO.org, Aug. 28, 2018.*
(Continued)

*Primary Examiner* — Gregory L Huson
*Assistant Examiner* — Daniel E Namay
(74) *Attorney, Agent, or Firm* — Thompson Hine LLP (57) ABSTRACT

A steam generator for generating steam by boiling water, or other hot water heating device, in either case such as for use in a steam cooker or warewasher, includes a tank structure providing a heating chamber for holding water, and at least one heating element associated with the tank structure for heating water. The tank structure includes a main body wall having a U-shaped cross-sectional profile formed by opposed first and second side wall portions of the heating chamber and a curved bottom wall portion of the heating chamber, wherein the curved bottom wall portion is monolithic with the first and second side wall portions, wherein the main body wall is sheet metal material that has been curved.

18 Claims, 5 Drawing Sheets

Related U.S. Application Data (60) Provisional application No. 62/199,358, filed on Jul. 31, 2015, provisional application No. 62/138,884, filed on Mar. 25, 2015.

(51) Int. Cl.
| | |
|---|---|
| *F28G 7/00* | (2006.01) |
| *A47L 15/14* | (2006.01) |
| *A47L 15/42* | (2006.01) |
| *F22B 37/48* | (2006.01) |
| *A47J 27/16* | (2006.01) |
| *F24D 19/00* | (2006.01) |

(52) U.S. Cl.
CPC .............. *F22B 1/284* (2013.01); *F22B 37/48* (2013.01); *F22B 37/486* (2013.01); *F28G 7/00* (2013.01); *A47J 2027/043* (2013.01); *F24D 19/0092* (2013.01)

(58) Field of Classification Search
CPC ... A47L 15/4234; F28G 7/00; F24D 19/0092; A21B 1/08; B01B 1/005
USPC ............ 126/369, 20; 122/79, 381, 382, 399; 219/401
IPC .............. A47J 27/04,27/16; F22B 1/28, 37/48; F28G 7/00; F24D 19/00; B01B 1/00
See application file for complete search history.

(56) References Cited

U.S. PATENT DOCUMENTS

| | | | | |
|---|---|---|---|---|
| 524,029 | A * | 8/1894 | Orvis | F01L 1/28 122/79 |
| 529,391 | A * | 11/1894 | Kendall | F22B 11/00 122/195 |
| 628,388 | A * | 7/1899 | Booker et al. | F28G 7/00 122/379 |
| 685,624 | A * | 10/1901 | Manley | F28G 7/00 122/32 |
| 702,939 | A * | 6/1902 | Gibbons | F28G 7/00 122/379 |
| 710,843 | A * | 10/1902 | Cone | F22B 37/54 122/381 |
| 711,860 | A * | 10/1902 | Hopkins | F22B 11/00 122/105 |
| 745,998 | A * | 12/1903 | Bonson | F22B 11/00 122/195 |
| 1,359,306 | A * | 11/1920 | Albrecht | A21B 1/08 126/20 |
| 1,877,389 | A * | 9/1932 | Daum | C02F 1/48 122/382 |
| 2,037,070 | A * | 4/1936 | Frentzel, Jr. | F24H 3/006 126/104 R |
| 2,359,155 | A * | 9/1944 | Renz | F22B 21/00 122/235.11 |
| 2,641,428 | A * | 6/1953 | Kirk | F16L 3/18 248/218.3 |
| 2,700,622 | A * | 1/1955 | Burwell | B65D 85/84 118/65 |
| 2,827,541 | A * | 3/1958 | Baldwin | A47J 27/04 392/331 |
| 2,948,926 | A * | 8/1960 | Kuhn | B29C 33/0022 249/141 |
| 3,052,615 | A * | 9/1962 | Johns | F22B 3/04 122/40 |
| 3,151,633 | A * | 10/1964 | Shuman | F16L 59/024 138/177 |
| 3,512,507 | A * | 5/1970 | Dixon | F22B 37/54 122/382 |
| 4,135,370 | A * | 1/1979 | Hosoda | F24F 3/1405 62/274 |
| 4,245,398 | A * | 1/1981 | Poisson | F26B 3/286 126/710 |
| 4,320,528 | A | 3/1982 | Scharton et al. | |
| 4,368,677 | A | 1/1983 | Kline | |
| 4,655,192 | A * | 4/1987 | Jovanovic | A21B 3/04 126/20 |
| 4,728,368 | A | 3/1988 | Pedziwiatr | |
| 4,883,036 | A * | 11/1989 | Sterk | F22B 37/483 122/383 |
| 4,948,947 | A * | 8/1990 | Kang | D06F 75/02 220/4.12 |
| 5,103,800 | A * | 4/1992 | Bedford | A47J 27/16 126/20 |
| 5,158,064 | A * | 10/1992 | Willis | A47J 27/04 126/20 |
| 5,394,791 | A | 3/1995 | Vallee | |
| D363,639 | S | 10/1995 | Vallee | |
| 5,549,038 | A * | 8/1996 | Kolvites | A47J 27/16 126/20 |
| D374,377 | S | 10/1996 | Vallee | |
| 5,653,164 | A | 8/1997 | Vallee | |
| 6,497,907 | B2 * | 12/2002 | Hofer | A21B 1/40 126/20 |
| 6,684,823 | B1 | 2/2004 | Plavnik | |
| 6,802,429 | B1 | 10/2004 | Wildman | |
| 6,947,664 | B1 * | 9/2005 | Yeh | A45C 15/00 219/387 |
| 7,353,821 | B2 | 4/2008 | Saksena | |
| 7,418,960 | B2 | 9/2008 | Saksena | |
| 7,810,488 | B2 * | 10/2010 | Manganiello | A21B 3/04 126/20 |
| 7,853,130 | B2 | 12/2010 | Frock et al. | |
| 8,080,766 | B2 | 12/2011 | Frock et al. | |
| 8,111,072 | B2 | 2/2012 | Saksena | |
| 8,354,620 | B2 | 1/2013 | Frock et al. | |
| 8,517,006 | B2 | 8/2013 | Frock et al. | |
| 8,601,939 | B2 | 12/2013 | Saksena et al. | |
| 8,695,487 | B2 * | 4/2014 | Sakane | F24C 15/327 126/369 |
| 9,423,150 | B2 * | 8/2016 | Cooper | F24H 1/0027 |
| 2006/0021521 | A1 * | 2/2006 | Cutrer, Jr. | A47J 27/04 99/516 |
| 2006/0107943 | A1 * | 5/2006 | Saksena | A21B 3/04 126/348 |
| 2006/0278630 | A1 * | 12/2006 | Sung | B24B 49/105 219/401 |
| 2007/0215142 | A1 * | 9/2007 | Uchiyama | F24C 1/04 126/369 |
| 2008/0008807 | A1 * | 1/2008 | Frock | A21B 3/04 426/520 |
| 2012/0199015 | A1 * | 8/2012 | Seguchi | F22B 1/284 99/403 |
| 2012/0211402 | A1 * | 8/2012 | Monaghan | B01J 4/002 208/308 |
| 2014/0261384 | A1 * | 9/2014 | Cooper | F24H 1/0027 126/369 |
| 2015/0083110 | A1 * | 3/2015 | Shibuya | F22B 1/28 126/369 |
| 2016/0000250 | A1 * | 1/2016 | Abe | A47J 37/0664 99/403 |
| 2016/0143472 | A1 * | 5/2016 | Chang | A47J 27/04 126/20 |
| 2016/0150906 | A1 * | 6/2016 | Lee | F24C 15/003 126/369 |
| 2016/0262562 | A1 * | 9/2016 | Jeong | A47J 27/04 |
| 2016/0282068 | A1 * | 9/2016 | Reckner | A47J 27/04 |
| 2016/0298873 | A1 * | 10/2016 | Chan | F22B 1/28 |
| 2018/0213964 | A1 * | 8/2018 | Frock | A21B 3/04 |

OTHER PUBLICATIONS

PCT, International Search Report and Written Opinion, International Application No. PCT/US2016/023032; dated Jun. 3, 2016, 11 pages.

* cited by examiner

STEAM GENERATOR

CROSS-REFERENCES

This application is a continuation-in-part of U.S. application Ser. No. 15/056,220 filed Feb. 29, 2016, which in turn claims the benefit of U.S. provisional application Nos. 62/137,884 filed Mar. 25, 2015 and 62/199,358 filed Jul. 31, 2015, all of which are incorporated herein by reference.

TECHNICAL FIELD

This application relates generally to steam generators and other hot water heating devices and, more specifically, to a steam generator or other hot water heating device incorporating a vibratory feature that reduces scale formation.

BACKGROUND

Steam generators are used in a variety of applications such as steam cooking systems. Many such steam generators are used in high volume situations. A typical steam generator includes a heating chamber (e.g., within a tank) with an associated heating element (e.g., gas or electric) that is used to heat water within the tank. As steam is produced and exits the tank (e.g., for delivery to a steam oven cooking chamber), water is added back into the tank. The steam production process produces scale deposits in the tank (e.g., on the inner surfaces of the tank walls and on any internal heating element). To reduce such scale build-up the water delivered into the tank may be filtered and/or treated by known water softening techniques. However, scale build-up still occurs, and such water pre-treatment systems can be expensive. Steam generators can also be periodically "delimed" using a chemical treatment process to remove the scale and flush it out of the steam generator tank. However, deliming is an added, undesired maintenance task for the end customer using the steam generator. Similar problems are encountered in steam generators and/or booster tanks used in warewash machines, as well as other types of water heating tanks.

Improvements in tank structures for steam generators and other water heating tanks are also sought.

It would be desirable to provide water heating tanks, such as steam generators, with reduced operational and maintenance costs relating to scale formation and/or a water heating tank with an improved structural configuration.

SUMMARY

In one aspect, a steam generator for generating steam by boiling water, or other hot water heating device, includes a tank structure providing a heating chamber for holding water, and at least one heating element associated with the tank structure for heating water. The tank structure includes a main body wall having a U-shaped cross-sectional profile formed by opposed first and second side wall portions of the heating chamber and a curved bottom wall portion of the heating chamber, wherein the curved bottom wall portion is monolithic with the first and second side wall portions, wherein the main body wall is sheet metal material that has been curved.

The details of one or more embodiments are set forth in the accompanying drawings and the description below. Other features, objects, and advantages will be apparent from the description and drawings, and from the claims.

DETAILED DESCRIPTION

Figure 1:
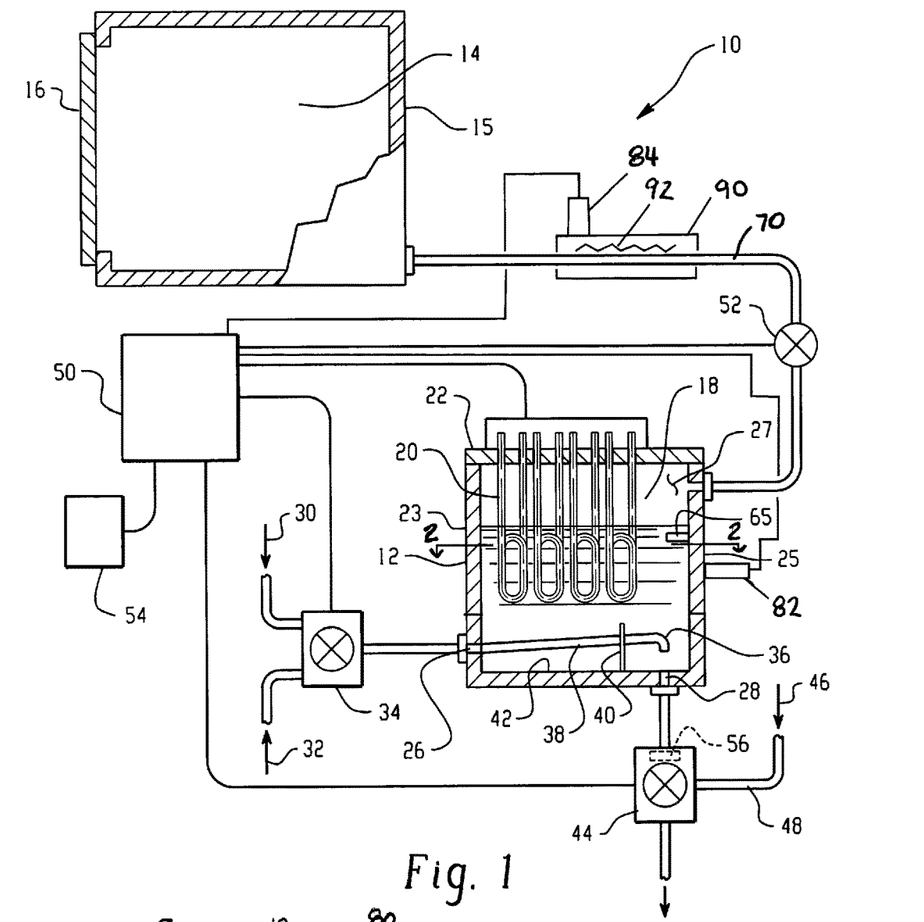
FIG. 1 is a schematic view of a steam cooking system including a steam generator.
Figure 2:
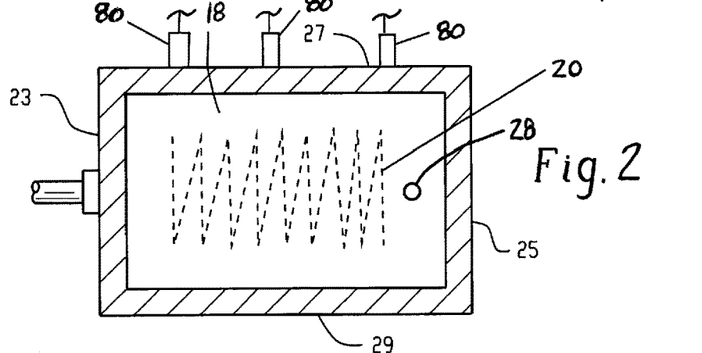
FIG. 2 is a cross-sectional view of the steam generator taken along line 2-2 of FIG. 1, with the resistive heating element(s) shown schematically in dashed line form and with the inlet pipe not shown.

Referring to FIGS. 1 and 2, an exemplary steam cooker 10 includes a steam generator 12 for generating steam and a cooking chamber 14 that is in communication with the steam generator. The cooking chamber 14 may be formed by an insulated housing 15 and includes a door 16 that is movable between open and closed positions to provide and inhibit access to the cooking chamber. The steam generator 12 includes opposing minor sidewalls 23, 25, opposing major sidewalls 27, 29, bottom wall 42 and top plate 22 defining a heating chamber 18 where water is heated (e.g., by submerged resistive heating element or elements 20) to generate steam. The steam cooker could be a countertop steamer or a floor-mounted steamer, both of which are commonly used in restaurants and other commercial cooking establishments.

The steam generator 12 includes an inlet 26, which in the illustrated embodiment is an opening in the steam generator wall through which an inlet pipe 38, having associated pipe support 40 and free end 36, passes, for ingress of water into the heating chamber 18 from a water source, and an outlet 28 for egress or draining of water from the heating chamber (e.g., when the chamber is to be drained based upon operation of a drain flow control device 44 (e.g., a valve), which in some cases may also control flow of cooling water from a water source (represented by arrow 46) that is connected to conduit 48). A temperature sensor 56 may be used to monitor water temperature of the draining water.

Inlet 26 can receive water from a filtered water source as represented by arrow 30 and/or an unfiltered water source as represented by arrow 32. In some cases, by making use of the vibratory scale reducing feature described below, the need for a filtered water source may be eliminated. An inlet flow control device 34 (e.g., a valve) may be located between the inlet 26 and both water sources to allow for selection between filtered and unfiltered water and to generally control the flow of water to the inlet 26 (e.g., under control of a controller 50 which receives water level signals from one or more sensors 65). Where only one source of water is provided, the flow control device 34 controls the flow from just the one source. A pre-selected water or fill level may be set. The fill level may be monitored using the water level sensor 65 (or multiple water level sensors) that provides an indication to the controller 50 of the level of the water within the heating chamber 18, including at least that sufficient water is present to operate the resistive heating elements in order to generate steam. The sensor(s) 65 may be within the main heating chamber 18 as shown, or could be contained in a housing unit that is placed alongside the main heating chamber and includes a path of fluid communication with the heating chamber (as might be provided by tubing).

Controller 50 is used to control flow of water to the heating chamber 18 through the inlet 26 and from the heating chamber through the outlet 28 and may also be used to activate and deactivate the heating elements 20 (e.g., in response to an indication received from a user interface 54 including a generator OFF/ON input). As steam is produced it exits the generator along path 70 (e.g., steam flow may be controlled by valve 52) and the water level in the heating chamber 18 drops. When the water level sensor(s) 65 detect a drop below a desired level, more water is added. This process repeatedly occurs during steam generation, and as water is boiled within the heating chamber minerals in the water remain and build-up over time, creating the potential for such minerals to deposit as scale on the surfaces within the heating chamber.

In this regard, the steam generator includes one or more sidewall mounted vibratory mechanisms 80 that operate to cause the water within the heating chamber 18 to vibrate. In the illustrated embodiment a series (here 3) of vibratory mechanisms 80 are distributed along the sidewall of the tank so as to be aligned vertically and/or horizontally with the resistive heating element(s) 20. However, other configurations are possible. Each vibratory mechanism 80 may be in the form of a transducer such as a high frequency transducer. By way of example, an ultrasonic transducer (e.g., of piezoelectric type) may be used, where each transducer is driven by a common frequency generator or where each transducer is driven by an independent frequency generator. The ultrasonic waves produced by the ultrasonic transducer are transmitted through the steam generator wall and cause the water to vibrate rapidly. The rapid vibration of the water within the steam generator inhibits scale build-up on the internal surfaces of the steam generator, including the heating element(s) 20. In some cases a bubbling effect within the water may be produced.

Thus, the need for use of pre-treated water can be significantly reduced or eliminated, and the need to run deliming operations on the steam generator can be significantly reduced or eliminated. The ultrasonic vibrations may also aid in removing any scale that has built up in the steam generator for any reason. Thus, production of ultrasonic vibrations during deliming operations may aid in the speed and/or effectiveness of the delime operation. Reduction of scale build-up on the heating element(s) 20 also enhances overall, long-term energy efficiency of the steam generator.

In one implementation, the ultrasonic transducer(s) 80 may be continually operated during all periods of steam generator operation, and only stopped when the steam generator is turned off. Alternatively, the transducer(s) 80 may be operated periodically or intermittently during steam generator operation. As noted above, the ultrasonic transducer(s) 80 may also be operated during deliming.

In another implementation, the ultrasonic transducer(s) 80 may be occasionally or periodically operated according to one or more predefined parameters. For example, the ultrasonic transducer(s) 80 may turned on for a defined time period based upon a triggering parameter such as (i) duration of steam generator operation, (ii) amount of water added to the steam generator over time, (iii) number of cooking cycles of an associated steam oven or (iv) some other parameter indicative of potential scale build-up in the steam generator.

In some implementations the triggering parameters can be adjusted through the control system interface (e.g., by service personnel) to account for known factors such as the hardness of the water being used at a location of steam generator install.

In one implementation the ultrasonic frequency of the transducer(s) 80 may be maintained constant (e.g., a frequency in the range of 25 kHz to 75 kHz, though other variations are possible). In other implementations the ultrasonic frequency may be varied during the course of transducer operation to better inhibit the scale formation. The transducer(s) 80 could be operated at one frequency or frequency range for scale inhibition and at another frequency or frequency range for scale removal.

In some applications acoustic insulation could be included around the ultrasonic transducer(s) 80 and/or steam generator tank 12 to reduce any noise produced to an acceptable level according to the environment in which the steam generator is being used.

While the above description focuses on the use of one or more ultrasonic transducer(s) on a sidewall of the steam generator, it is recognized that one or more transducer(s) could be positioned on a bottom wall. Furthermore, although an external transducer is shown, it is recognized that the transducer could be located internal of the steam generator as well. The size and power output of the transducer(s) may vary depending upon the size/volume of the steam generator.

As suggested in FIG. 1, the steam cooker 10 may further include a superheater arrangement 90 along the steam path 70. The superheater includes one or more resistive heating elements 92 (e.g., external or internal of the steam path) for transferring additional heat to the steam traveling along the steam path 70 for the purpose of superheating the steam. Generally, steam is considered superheated when the temperature of the steam is increased above 212 degrees F. without pressurization. In such arrangements scale deposits can also occur within the superheater 90. To reduce such scale build-up one or more ultrasonic transducer(s) 82 may be located on the steam generator sidewall 25 proximate the steam outlet to the steam path 70 so that some vibration will be transferred along the steam path structure to the surfaces of the superheater 90, which in some cases can deter scale particles (borne by the steam flow) from attaching to the surfaces of the superheater. One or more ultrasonic transducer(s) 84 could also be attached directly to the superheater 90 as shown for more effective vibratory action. In some circumstances, one, two or all three of the transducers 80, 82 and 84 may be implemented in a single steam cooker.

Although resistive heating elements are primarily described above for the steam generator and the superheater, it is also recognized that other heating devices (e.g., gaseous heat exchangers carrying combustion gases) could be used. Moreover, such ultrasonic scale control could also be implemented in steam generators used for purposes other than steam cookers (e.g., such as for steam production in warewash machines) and the ultrasonic scale control could also be implemented in other types of water heating tanks (e.g., such as hot water booster tanks used to heat rinse water in warewash machines).

Figure 3:
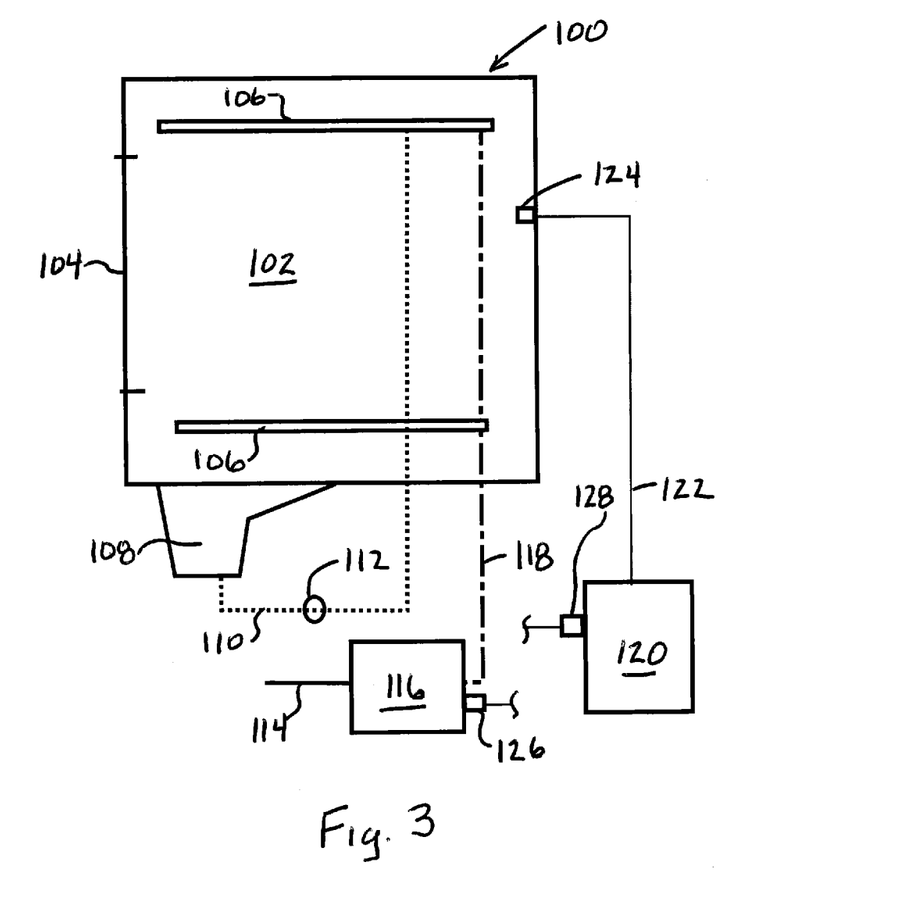
FIG. 3 is a schematic depiction of a warewash machine with a hot water booster and steam generator including vibratory scale reduction.

By way of example, a warewash machine 100 is shown schematically in FIG. 3 and includes one or more wash and/or rinse chamber(s) 102 accessible by one or more door(s) 104. The wash and/or rinse chamber(s) may include one or more spray arm(s) 106 (stationary or rotating, with associated spray nozzles) for spraying wash and/or rinse liquid. The wash liquid may be recirculated via a sump 108, recirculation line 110 and pump 112. The rinse liquid may be fresh water delivered by inlet line 114 to a booster tank 116 that heats the water to be delivered by line 118 to the spray arms. The warewash machine may also include a steam generator 120 that delivers steam by a line 122 to one or more steam nozzles 124 in the wash chamber. Further details regarding warewash machines (both box-type and conveyor-type) can be found in U.S. Pat. Nos. 8,663,395 and 8,679,261, which are incorporated herein by reference. Referring again to FIG. 3, each of the hot water booster 116 and/or the steam generator can include one or more respective ultrasonic transducer(s) 126, 128 for the purpose of scale reduction as described above.

Referring now to FIGS. 4-7, another embodiment of a steam generator 200 is provided (where the top down mounted heating elements are not shown). The steam generator 200 includes a tank structure 202 provides a heating chamber 204 therein for holding water. The tank structure 202 includes a main body wall 206 having a U-shaped cross-sectional profile (e.g., when the cross-section is taken in a plane parallel to the tank end wall 220) formed by opposed side wall portions 208 and 210 of the heating chamber and a curved bottom wall portion 212 of the heating chamber. Notably, the curved bottom wall portion 212 is monolithic with the first and second side wall portions 208 and 210. In this regard, the main body wall may be of sheet metal material (e.g., stainless steel) that has been curved into the form shown.

Figure 6:
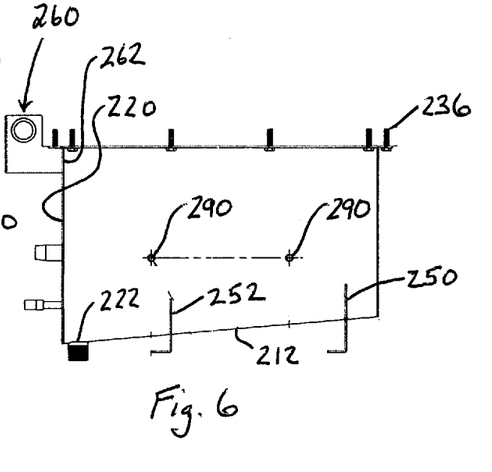
FIG. 6 is a side elevation of the tank structure of FIG. 4.
Figure 7:
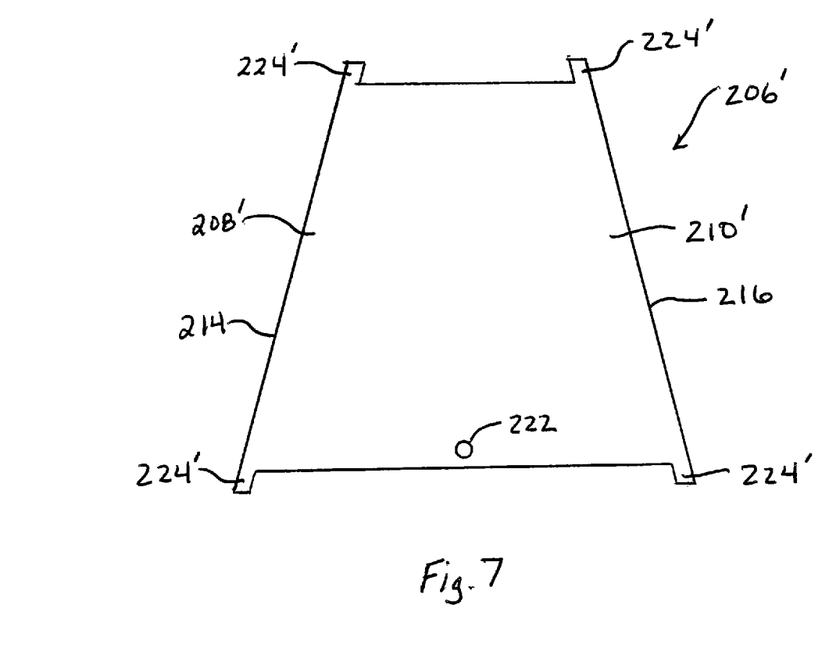
FIG. 7 is a top plan view of sheet material used to form the main body wall of the tank structure.

In this regard, the main body wall 206 may be formed of sheet metal material 206' having a substantially trapezoidal configuration when laid flat prior to being curved, per FIG. 7. When the central portion of the material 206' is curved so as to bring the left and right side portions 208' and 210' of the material in parallel with each other to bring the left and right side edges 214 and 216 to the same height lying in a horizontal plane, the result will be that one end of the resulting curved bottom wall portion will be higher than an opposite end of the curved bottom wall portion (per FIG. 6) to provide an incline in the curved bottom wall portion 212 that leads downward toward a drain outlet 222 that is located in curved bottom wall portion 212. The substantially trapezoidal configuration of sheet material 206' may include a tab 224' at each corner for use in forming mounting flanges for the top mounted heating element assembly.

Figure 4:
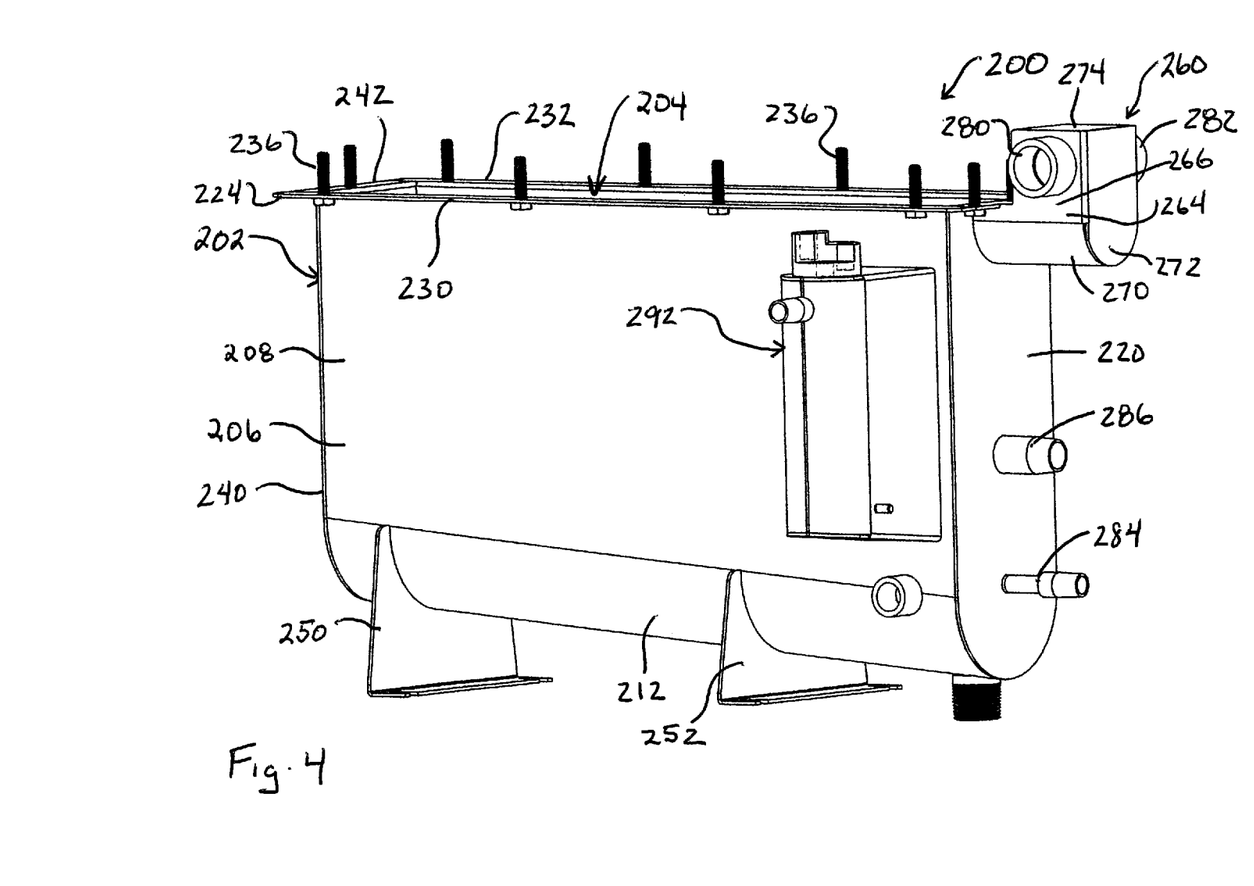
FIG. 4 is a perspective view of one embodiment of a tank structure useful as a steam generator for a steam cooking oven.
Figure 5:
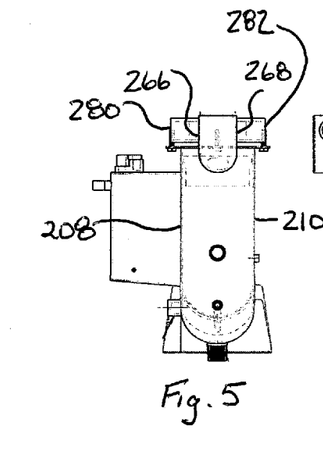
FIG. 5 is an end elevation of the tank structure of FIG. 4.

More specifically, as seen in FIG. 4, the main body wall of the tank structure includes a side flange 230 at a top of the side wall portion 208 and a side flange 232 at a top of the side wall portion 210. The side flange 230 is formed by a ninety degree bend in the main body wall and the side flange 232 is formed by a similar ninety degree bend in the main body wall. Thus, the side flanges 230 and 232 are also monolithic with the side wall portions 208 and 210. The flanges may include bolts 236 extending upward through holes in the flanges for the purpose of receiving a heating element assembly (such as that represented in FIG. 1) that can then be tightened down using nuts. Although not shown in FIG. 7, the bolt holes may be cut or stamped into the material 206' prior to the curving operation. The side flanges include end tab portions 224 (e.g., formed by the tabs 224') that extend beyond the end edges of the side wall portions 208 and 210.

After the curving operation the U-shaped main body wall 206 is open at the ends. Accordingly, end walls 220 and 240 are welded at the opposite ends of the main body wall 206. The upper portion of each end wall 220 and 240 is bent to form end flanges (e.g., 242) that align with and sit between the end tab portions 224 of the side flanges.

In order to provide a stable support for the tank structure 202, support brackets 250 and 252 are connected (e.g., by welding) to and extend downward from an exterior of the main body wall, with the brackets 250 and 252 spaced apart such that one bracket 250 is mounted toward one end and bracket 252 is mounted toward the opposite end. The bracket 250 has a height that is greater than a height of the bracket 252 due to the inclined curved bottom wall of the tank structure.

A steam duct 260 is connected (e.g., by welding) to the tank structure 202 to receive steam from an upper steam outlet 262 through the end wall 220. The steam duct 260 includes a main duct wall 264 also having a U-shaped cross-sectional profile formed by opposed duct side wall portions 266 and 268 and a curved duct bottom wall portion 270. Similar to the tank structure itself, the curved duct bottom wall portion 270 is monolithic with the side wall portions 266 and 268, and the main duct wall may also be of sheet metal material that has been curved. An end wall 272 and top wall 274 encloses the duct structure, both of which may also be attached by welding.

The steam duct 260 itself is welded to the tank structure 202 and includes opposed pipe couplings 280 and 282. Pipe coupling 280 has a distal end projecting to one side of the tank structure and pipe coupling 282 has a distal end projecting to an opposite side of the tank structure. Thus, the tank structure provides for flexible connection of piping on either side in order to deliver steam to the desired location (e.g., a steam oven chamber). Fresh water inlet coupling 284 and delime agent input coupling 286 are also provided in the end wall 220.

As seen in FIG. 6, mount studs 290 may be provided on the exterior of the side wall portion of the tank structure for use in the mounting of transducers to the tank structure for scale reduction as described above. A side box 292 mounted to the tank structure may house water level sensors for the tank structure, where the interior of the side box 292 is fluidly connected to the heating chamber of the tank structure.

While the tank structure 202 of FIGS. 4-7 is particularly useful as a steam generator (with or without vibratory transducers), it is recognized that the tank structure 202 could also be used for other water heating purposes.

It is to be clearly understood that the above description is intended by way of illustration and example only, is not intended to be taken by way of limitation, and that other changes and modifications are possible.

What is claimed is:

1. A steam cooker, comprising:
   a steam cooking chamber;
   a steam generator external of the steam cooking chamber and plumbed to deliver steam from a steam outlet of the steam generator to a steam inlet of the steam cooking chamber, the steam generator including:
   a tank structure providing a heating chamber for holding water;
   at least one heating element associated with the tank structure for heating water to generate steam;
   wherein the tank structure includes a main body wall having a U-shaped cross-sectional profile formed by opposed first and second side wall portions of the heating chamber and a curved bottom wall portion of the heating chamber, wherein the curved bottom wall portion is monolithic with the first and second side wall portions, wherein the main body wall is sheet metal material that has been curved,
   wherein the first side wall portion and the second side wall portion are substantially parallel, and wherein the curved bottom wall portion is continuously curved between the first side wall portion and the second side wall portion; and wherein the tank structure further includes at least one ultrasonic transducer associated with the tank structure to vibrate water within the heating chamber, wherein the ultrasonic transducer is mounted on an external surface of the first side wall portion below an operating water level of the heating chamber, and ultrasonic waves produced by the ultrasonic transducer are transmitted through the first side wall portion and into water within the heating chamber in order to inhibit formation of scale on internal surface portions of the tank structure.

2. The steam cooker of claim 1 wherein the main body wall is formed of sheet metal material having a substantially trapezoidal configuration when laid flat prior to being curved, such that one end of the curved bottom wall portion is higher than an opposite end of the curved bottom wall portion to provide an incline in the curved bottom wall portion.

3. The steam cooker of claim 2 wherein a drain outlet is located proximate the opposite end of the curved bottom wall portion.

4. The steam cooker of claim 2 further comprising a first support bracket connected to and extending downward from an exterior of the main body wall toward the one end and a second support bracket connected to and extending downward from the exterior of the main body wall toward the opposite end, wherein a height of the first support bracket is greater than a height of the second support bracket.

5. The steam cooker of claim 1, further comprising a first end wall welded at one end of the main body wall and a second end wall welded at an opposite end of the main body wall.

6. The steam cooker of claim 1 wherein the main body wall further includes a first side flange at a top of the first side wall portion and a second side flange at a top of the second side wall portion, wherein the first side flange is formed by a first bend in the main body wall and the second side flange is formed by a second bend in the main body wall, such that the first and second side flanges are monolithic with the first and second side wall portions.

7. The steam cooker of claim 6 wherein the first side flange includes end tab portions that extends beyond end edges of the first side wall portion, and the second side flange includes end tab portions that extend beyond end edges of the second side wall portion.

8. The steam cooker of claim 1, further comprising:
a steam duct welded to the tank structure to receive steam from the steam outlet,
wherein the steam duct includes a main duct wall having a U-shaped cross-sectional profile formed by opposed first and second duct side wall portions and a curved duct bottom wall portion, wherein the curved duct bottom wall portion is monolithic with the first and second duct side wall portions, wherein the main duct wall is of sheet metal material that has been curved.

9. The steam cooker of claim 8,
wherein the steam duct is welded to the tank structure,
wherein the steam duct includes opposed first and second pipe couplings, wherein the first pipe coupling has a distal end projecting to a first side of the tank structure and the second pipe coupling has a distal end projecting to a second side of the tank structure.

10. A hot water heating apparatus, comprising:
a tank structure providing a heating chamber for holding water;
at least one heating element associated with the tank structure for heating water;
wherein the tank structure includes a main body wall having a U-shaped cross-sectional profile formed by opposed first and second side wall portions of the heating chamber and a curved bottom wall portion of the heating chamber, wherein the curved bottom wall portion is monolithic with the first and second side wall portions, wherein the main body wall is sheet metal material that has been curved to produce the first and second side wall portions in an opposed relationship, with the bottom wall portion continuously curving between the first and second side wall portions, and wherein the tank structure further includes at least one ultrasonic transducer associated with the tank structure to vibrate water within the heating chamber, wherein the ultrasonic transducer is mounted on an external surface of the first side wall portion below an operating water level of the heating chamber, and ultrasonic waves produced by the ultrasonic transducer are transmitted through the first side wall portion and into water within the heating chamber in order to inhibit formation of scale on internal surface portions of the tank structure.

11. The apparatus of claim 10 wherein the main body wall is formed of sheet metal material having a substantially trapezoidal configuration when laid flat prior to being curved, such that one end of the curved bottom wall portion is higher than an opposite end of the curved bottom wall portion to provide an incline in the curved bottom wall portion, and a drain outlet is located in curved bottom wall portion toward the opposite end.

12. The apparatus of claim 11 wherein the substantially trapezoidal configuration includes a tab at each corner.

13. The apparatus of claim 10, further comprising a first end cap welded at one end of the main body wall and a second end cap welded at an opposite end of the body wall.

14. The apparatus of claim 10 wherein the main body wall further includes a first side flange at a top of the first side wall portion and a second side flange at a top of the second side wall portion, wherein the first side flange is formed by a first bend in the main body wall and the second side flange is formed by a second bend in the main body wall, such that the first and second side flanges are monolithic with the first and second side wall portions.

15. The apparatus of claim 14 wherein the first side flange includes end tab portions that extends beyond end edges of the first side wall portion, and the second side flange includes end tab portions that extend beyond end edges of the second side wall portion.

16. The apparatus of claim 14 wherein the heating element is part of an assembly that is mounted to the first side flange and the second side flange.

17. The apparatus of claim 10, where the apparatus is formed as a steam generator, further comprising:
the tank structure including a steam outlet,
a steam duct welded to the tank structure to receive steam from the steam outlet,
wherein the steam duct includes a main duct wall having a U-shaped cross-sectional profile formed by opposed first and second duct side wall portions and a curved duct bottom wall portion, wherein the curved duct bottom wall portion is monolithic with the first and second duct side wall portions, wherein the main duct wall is of sheet metal material that has been curved.

18. The apparatus of claim 17,
wherein the steam duct is welded to the tank structure,
wherein the steam duct includes opposed first and second
   pipe couplings, wherein the first pipe coupling has a
   distal end projecting to a first side of the tank structure
   and the second pipe coupling has a distal end projecting
   to a second side of the tank structure.

\* \* \* \* \*